United States Patent
Sones

(10) Patent No.: US 7,187,797 B2
(45) Date of Patent: Mar. 6, 2007

(54) COLOR MACHINE VISION SYSTEM FOR COLORIMETRY

(75) Inventor: Richard A. Sones, Cleveland, OH (US)

(73) Assignee: Applied Vision Company, LLC, Akron, OH (US)

( * ) Notice: Subject to any disclaimer, the term of this patent is extended or adjusted under 35 U.S.C. 154(b) by 853 days.

(21) Appl. No.: 10/404,027

(22) Filed: Apr. 1, 2003

(65) Prior Publication Data

US 2004/0197020 A1 Oct. 7, 2004

(51) Int. Cl.
*G06K 9/00* (2006.01)
(52) U.S. Cl. .................................... 382/162
(58) Field of Classification Search ............... 382/162, 382/165, 167; 348/187, 188; 356/405, 406, 356/408, 421; 702/127
See application file for complete search history.

(56) References Cited

U.S. PATENT DOCUMENTS

| | | | |
|---|---|---|---|
| 5,495,429 A * | 2/1996 | Craven et al. ............. | 702/127 |
| 5,754,448 A | 5/1998 | Edge et al. | |
| 5,835,244 A | 11/1998 | Bestmann | |
| 5,850,472 A * | 12/1998 | Alston et al. ............. | 382/162 |
| 6,340,976 B1 | 1/2002 | Oguchi et al. | |
| 6,459,425 B1 | 10/2002 | Holub et al. | |
| 6,501,850 B1 | 12/2002 | Setchell, Jr. | |

OTHER PUBLICATIONS

Jon Y. Hardebert, Francis Schmitt, Hans Brettel, "Multispectral image capture using a tunable filter," Ecole Nationale Supérieure des Télécommunications (Paris, France).

* cited by examiner

*Primary Examiner*—Jose L. Couso
(74) *Attorney, Agent, or Firm*—Hahn Loeser & Parks, LLP; Robert J. Clark

(57) ABSTRACT

A method of inspection for use with color machine vision systems is provided in which a device-independent digital colorimetric image of a reference object is created on a first machine vision system. The digital colorimetric image can then be shared with other machine vision systems by sending the image electronically, instead of requiring the sharing of the actual reference object. A video image can then be calculated on the second machine vision system using the colorimetric image. The calculated video image can then be used as a reference for comparisons during video inspection on the second machine vision system.

18 Claims, 4 Drawing Sheets
(2 of 4 Drawing Sheet(s) Filed in Color)

COLOR MACHINE VISION SYSTEM FOR COLORIMETRY

FIELD OF THE INVENTION

The present invention generally relates to color machine vision systems, and more particularly to a method of inspection for use with color machine vision systems wherein a device-independent colorimetric image of a reference object is created on a first machine vision system which can then be shared with other machine vision systems, instead of requiring the sharing of the actual reference object. A video image can then be calculated on the second machine vision system using the calorimetric image and used as a reference for comparisons during video inspection on the second machine vision system.

BACKGROUND OF THE INVENTION

Since the introduction of the CIE (Commission Internationale de l'Eclairage) color measurement system in the early 1930's, many different color spaces have been proposed for different applications. One such color space is the CIE XYZ color space. The CIE XYZ color space characterizes colors by a luminance parameter Y and two color coordinates X and Z which specify the point on the chromaticity diagram. The XYZ parameters are based on the spectral power distribution of the light emitted from a colored object and are factored by sensitivity curves which have been measured for the human eye. The human eye has three different types of color sensitive cones. Accordingly, the XYZ functions were intended to correspond to the average sensitivity of the human eye and provide a device-independent representation of color. Therefore, the spectral responses of the XYZ functions are known as "tristimulus" functions and make up the coordinate system to quantify a color image or color space.

The apparent color of an object depends not only on its intrinsic spectral reflectivity, but also on the spectrum of the light used to illuminate it. The CIE also has defined a number of standard illuminants which are defined theoretically, in terms of their spectral content. To completely specify the color of an object, one must measure the XYZ values of the light emanating from the object when it is illuminated by a standard illuminant.

The process of quantitative color analysis is generally referred to as colorimetry. Currently, most, if not all, precise measurements of object color are made by one of two devices; a tristimulus colorimeter or a reflectance spectrophotometer. A colorimeter uses a light source approximating a standard illuminant and three photoreceptors with spectral responses approximating the XYZ tristimulus responses. The colorimeter is typically a small hand-held device with a circular measurement aperture about 5 mm in diameter. The aperture is held against a colored object and the user initiates a measurement by pressing a button. The measurement typically takes about 1 second. A spectrophotometer is a more sophisticated, flexible and accurate device which measures the entire reflectance spectrum of a colored object using a light source whose spectrum is known. The XYZ values for a user-specified illuminant are calculated from the reflectance and illumination spectra. Spectrophotometers are also typically small hand-held devices and operate similar to calorimeters. However, in many applications the use of calorimeters and/or spectrophotometers is not well suited as these devices suffer from a number of disadvantages. These devices usually require flat object samples and precisely controlled viewing conditions in order to provide a satisfactory measurement of object color. The devices are limited in that they measure the color of a small disk-shaped region one location at a time, and are unable to obtain color measurements for multiple locations on the surface of the object or sample at the same time. The devices are relatively slow. In addition, these devices tend to be expensive due to the manufacturing care necessary to construct a device capable of providing precise color measurements suitable for laboratory use. These disadvantages make these devises particularly unsuitable for the machine vision system environment as they do not have the ability to perform 100% on-line inspection of colorful printed objects (such as floor tiles, credit cards, decorated metal sheets, . . . ) as they are being manufactured.

Color machine vision systems typically utilize a color video camera. A color camera typically generates three separate images: one red (R), one green (G) and one blue (B) referred to collectively as RGB which denotes a coordinate system by which a color can be quantified. These images are typically created by filtering the imaged light with red, green and blue filters. The RGB images are device-dependent values meaning that two different color cameras will typically give two different RGB values for the same object under the same illumination.

Color machine vision systems utilizing color video cameras are capable of 100% on-line inspection, however, to obtain acceptable results when using more than one machine vision system, a standard reference object must be imaged by each system. This can present a problem when using more than one system, especially when the system is in another location. The standard reference object then needs to be shipped back and forth between locations. Reference objects must be carefully stored and handled and can deteriorate with use, especially when sharing the object between two or more distant sites.

Accordingly, there is a need in the art for a color machine vision system that is capable of colorimetry and does not need to share a reference object between two or more color machine vision systems.

SUMMARY OF THE INVENTION

The present invention overcomes at least one of the aforementioned disadvantages by providing a video inspection method based on comparing a digital image obtained with a first machine vision system to a digital image obtained with a second machine vision system, the method comprising the steps of: determining a color response function for a first machine vision system, determining a color response function for a second machine vision system, acquiring a first video image on the first machine vision system, combining the first video image with the color response function for the first machine vision system to obtain a colorimetric image, transporting the calorimetric image to the second machine vision system, calculating a second video image using the calorimetric image and the color response function for the second machine vision system, wherein the second video image simulates the video image of the reference object imaged on the second machine vision system, and using the second video image as a reference for comparisons during video inspection on the second machine vision system.

BRIEF DESCRIPTION OF THE DRAWINGS

The patent or application file contains at least one drawing executed in color. Copies of this patent with color drawing(s) will be provided by the Patent and Trademark Office upon request and payment of necessary fee.

The invention and developments thereof are described in more detail in the following by way of embodiments with reference to the drawings, in which.

DETAILED DESCRIPTION

Figure 1:
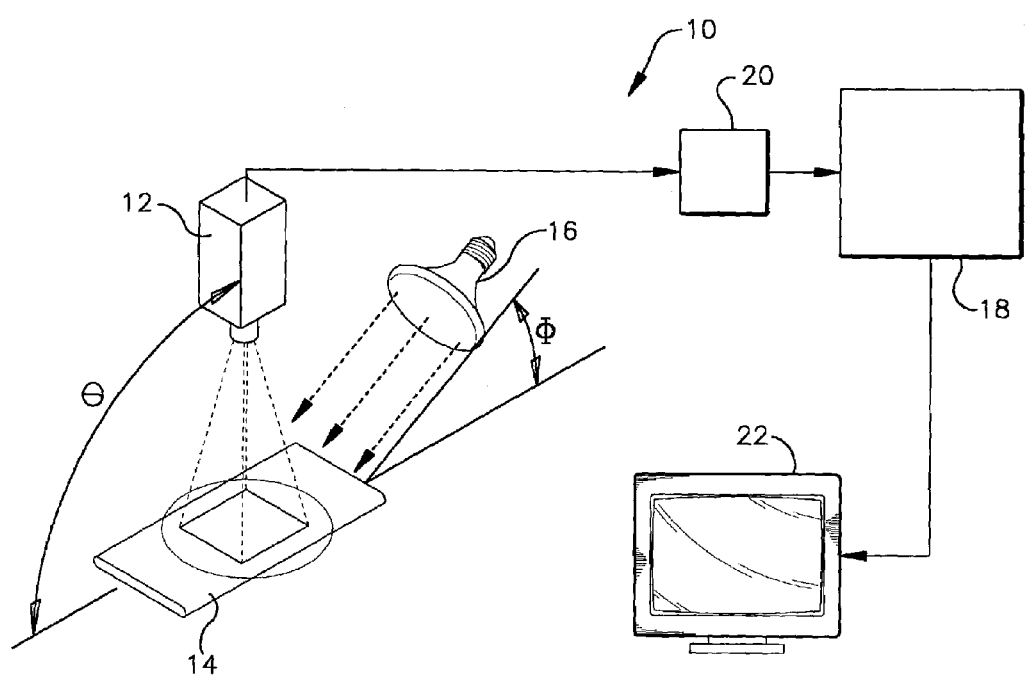
FIG. 1 shows a machine vision inspection system of the type used in the present invention.

Referring to FIG. 1, a machine vision system 10 comprises a three-color camera 12 providing RGB color signals, in the form of analog or digital electrical signals, regarding the object 14 illuminated by a light 16 and imaged with the camera 12. The light is oriented at a first angle $\Phi$, typically 45 degrees to the object surface. The camera is oriented at a second angle $\theta$, typically 90 degrees to the object surface. Examples of three-color cameras include, for example, CCD video cameras—still cameras—line scan cameras, CID video cameras—still cameras—line scan cameras, etc. The camera 12 is connected to a computer 18 which may include a frame grabber 20, for transforming analog RGB signals into an RGB digital image. If a digital three-color camera is used, a frame grabber may be unnecessary. The RGB digital signals are then transmitted to the computer processor 18. The machine vision system may further comprise a video monitor 22 for viewing the results provided by the computer processor 18.

The RGB values output by a real color camera do not exactly correspond to the XYZ values which would be output by an ideal tristimulus camera, and likewise, the spectrum of a real light source never precisely corresponds to a standard illuminant. However, it is possible to use a real color camera and a real light source and determine an approximate "best-fit" functional mapping from the camera's RGB values to ideal XYZ values. While the RGB-to-XYZ mapping is an approximation, the accuracy of the approximation is sufficient for practical color comparisons.

The best-fit functional mapping provides a color response function for the machine vision system. The mapping is determined based on an empirical calibration of the machine vision system. In particular, a color chart with known colors (that is, colors which have been carefully measured with a spectrophotometer or calorimeter) is imaged and the RGB values of the color patches are extracted. Then a mathematical procedure, such as linear regression, is used to derive the best-fit mapping from RGB to XYZ, and vice versa. For example, the simple linear transform $$\begin{bmatrix} X \\ Y \\ Z \end{bmatrix} = V_0 + M \begin{bmatrix} R \\ G \\ B \end{bmatrix}, \text{ where } V_0 = \begin{bmatrix} X_0 \\ Y_0 \\ Z_0 \end{bmatrix} \text{ and } M = \begin{bmatrix} M_{00} & M_{01} & M_{02} \\ M_{10} & M_{11} & M_{12} \\ M_{20} & M_{21} & M_{22} \end{bmatrix}$$

has been found effective. The present invention is not intended to be limited to this particular transform, other transforms, such as those based on quadratic or cubic polynomials, could also be used. Here the subscripted constants are determined by linear regression from a number (typically twenty-four, but not limited to a particular number) of measured, XYZ-to-RGB correspondences.

The method of the present invention creates a digital reference image as a combination of the actual image, that is, the array of RGB pixel values, plus the corresponding system calibration function represented by the matrix M and offset vector $V_0$. The image and calibration function data sets are stored together and viewed as a single data object—the digital reference image.

Figure 2:
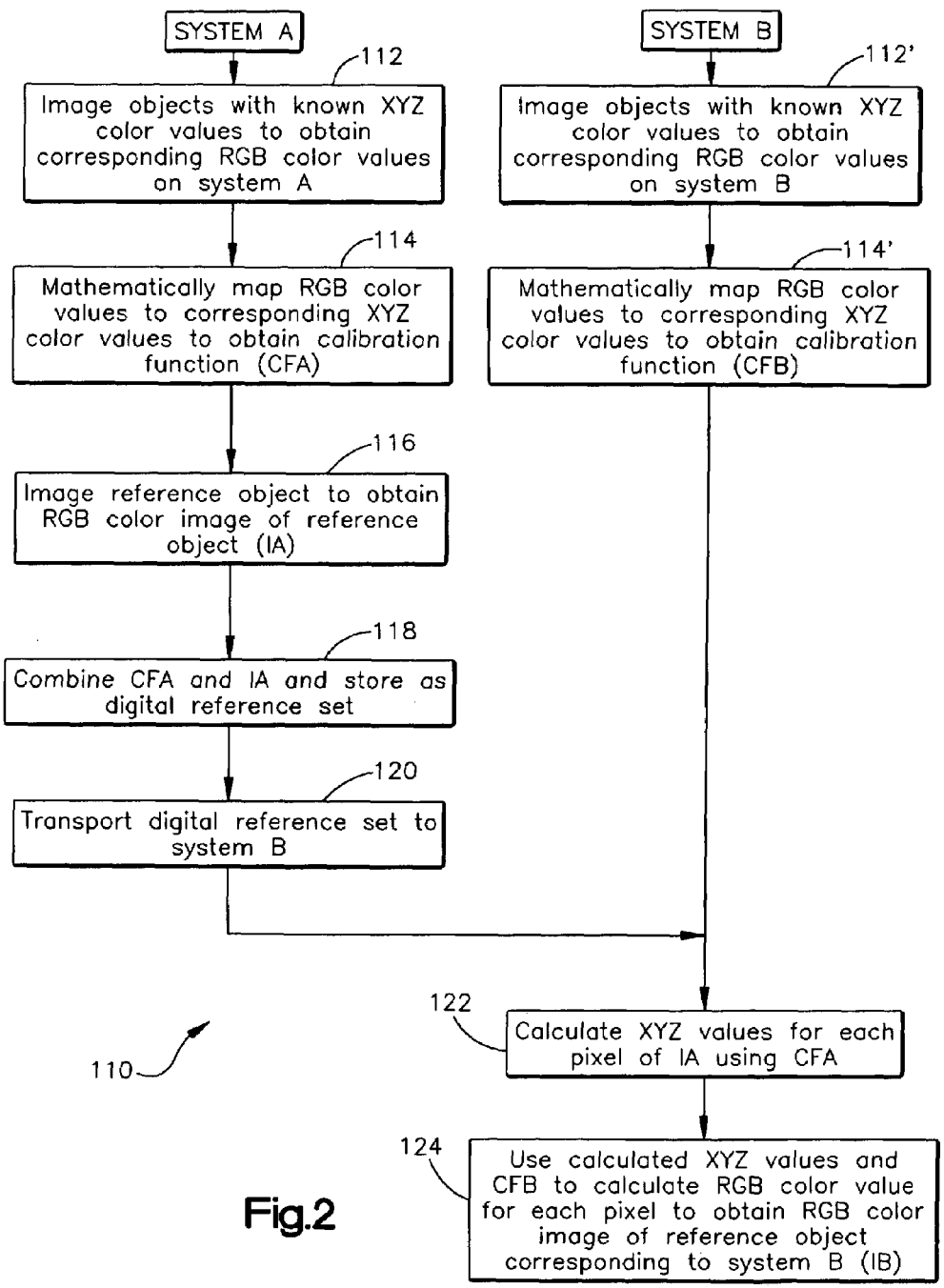
FIG. 2 shows a method of creation and use of the digital reference image of the present invention in a situation where there are two different machine vision systems.

Referring now to FIG. 2, the method 110 of creation and use of the digital reference image is illustrated in a situation where there are two different machine vision systems, the first system designated system A and the second system designated system B. Each system has its own color calibration chart, and each color calibration chart has a number of color patches with known XYZ tristimulus values. The color calibration charts are imaged to obtain RGB values of each color patch 112, 112'. A calibration function is then obtained for each system by mathematically mapping RGB color values to corresponding XYZ tristimulous values to obtain a calibration function 114, 114'. The calibration function of system A, CFA, is designated as $M_A$ and $V_{0A}$ and the calibration function of system B, CFB, is designated as $M_B$ and $V_{0B}$. The first machine vision system A is used to acquire an RGB image IA of a reference object 116. The calibration function CFA ($M_A$ and $V_{0A}$) and image IA are stored together and comprise the digital reference set DA 118. The digital reference set DA is then transported to system B 120. Using the image and color calibration function stored within the digital reference set DA, the tristimulous values are calculated on system B $$\begin{bmatrix} X \\ Y \\ Z \end{bmatrix} = V_{0A} + M_A \begin{bmatrix} R \\ G \\ B \end{bmatrix}_A$$

for each pixel of image IA 122. As previously mentioned, tristimulous values are system-independent and therefore there are no subscripts on the (X,Y,Z) vector. The system B color calibration is now used to convert these tristimulous values to the pixel values $$\begin{bmatrix} R \\ G \\ B \end{bmatrix}_B = M_B^{-1} \left( \begin{bmatrix} X \\ Y \\ Z \end{bmatrix} - V_{0B} \right).$$

Note that each pixel value of image IA has been converted to a new pixel value—these new pixel values constitute the new image IB 124. In an ideal situation, the relationship between image IA and image IB is that image IB is identical to the image which would have been obtained if the original reference object had been imaged on system B instead of system A. Thus, without actually transporting the reference object to system B, it is possible to obtain an image of the object as if it had been transported to system B. Color comparisons (inspections) can now be performed on system B and obtain the results equivalent to those obtained on system A. Systems A and B could be on the same factory floor running at the same time, or they could be thousands of miles apart. No reference object need be transported and preserved. All that needs to be preserved and transported (transmitted) is the digital reference data set DA which can be e-mailed and stored on a computer.

In practice, because the mapping of (R,G,B) values to (X,Y,Z) values is only approximate, the image IB will not be identical to the image which would have been obtained if the reference object had been imaged on system B. However, experiments indicate that the procedure greatly improves system-to-system color correlation as is discussed in detail below.

The RGB color coordinates and XYZ tristimulus coordinates are often viewed, mathematically, as spaces, since they comprise three-dimensional manifolds of real numbers. Another color space which is frequently used is the L*a*b* color space defined by CIE. We introduce the L*a*b* color space because it is useful for illustrating and quantifying the performance of the digital reference set corrections. The values of L*, a* and b* are derived mathematically from the tristimulus values of X, Y and Z:

$$L^* = 116 \left(\frac{Y}{Y_n}\right)^{1/3} - 16$$

$$a^* = 500 \left[\left(\frac{X}{X_n}\right)^{1/3} - \left(\frac{Y}{Y_n}\right)^{1/3}\right]$$

$$b^* = 200 \left[\left(\frac{Y}{Y_n}\right)^{1/3} - \left(\frac{Z}{Z_n}\right)^{1/3}\right]$$

where the values with the subscript "n" are found in published tables and correspond to a chosen standard illuminant. The value of L* is proportional to the brightness (luminosity) of the color. The value of a* describes the red/green composition of the color. The value of b* describes the yellow/blue composition of the color.

The goal of the L*a*b* color space is to provide a color space where the Euclidean distance $$\Delta E = \sqrt{(L_1^* - L_2^*)^2 + (a_1^* - a_2^*)^2 + (b_1^* - b_2^*)^2}$$

between color 1 and color 2 is a "perceptually uniform" measure of the difference between color 1 and color 2. A value of ΔE=1 corresponds to a color difference which is very subtle—so subtle that it would take a trained color observer working under ideal lighting conditions to notice the difference. A value of ΔE=2 corresponds to a difference in color which is twice as noticeable as ΔE=1, and so on. The "perceptual distance" denoted by a given value of ΔE is intended to be independent of the location in color space (that is, independent of hue, saturation and brightness), but this independence is actually only an approximation. Regardless, ΔE has been accepted in the color industry to quantify color differences.

Figure 3:
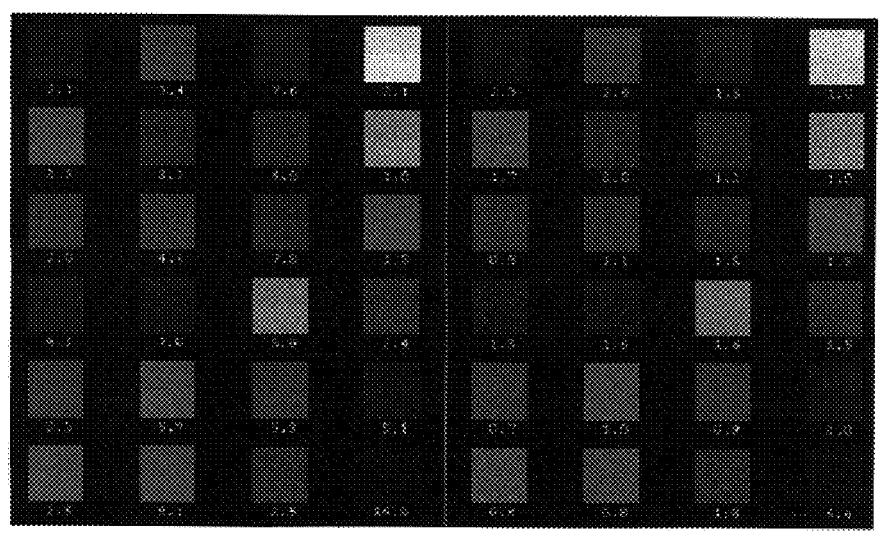
FIG. 3 shows a comparison of composite images derived from mean RGB measurements of actual camera images of a color calibration chart taken with system A and system B on the left half of FIG. 3; and a comparison of composite images derived from mean RGB measurements of actual camera images of a color calibration chart taken with system B and derived values for system A using the method of the present invention on the right half of FIG. 3.

Referring now to FIG. 3, a comparison of the performance of system A and system B when they both imaged the same twenty-four patch color chart is shown. The figure is not itself an image of the color chart, but rather a graphical comparison of the colors imaged by the two systems. The twenty-four color squares shown in the left half of FIG. 3 correspond to the twenty-four color patches of the, imaged color chart; and the twenty-four color squares shown in the right half of FIG. 3 also correspond to the twenty-four color patches of the imaged color chart. The top half of each of the forty eight color squares in FIG. 3 shows the mean RGB color (mean R value, mean G value, and mean B value) measured by system B for the corresponding color patch. The bottom half of each of the twenty-four color squares in the left half of FIG. 3 shows the mean RGB color measured by system A for the corresponding patch. The bottom half of each of the twenty-four color squares in the right half of FIG. 3 shows the color for the corresponding patch after conversion of system A mean RGB colors to system B RGB colors using the inventive technique (steps 122 and 124 of FIG. 2). The number below each color square indicates the ΔE value between the color of the top and the color of the bottom of the square. This ΔE value is calculated using the system B color calibration function to generate XYZ tristimulous values, from which are computed L*a*b* values and, finally, ΔE. Ideally, if both systems A and B were identical in performance, no color difference would be apparent between the top and bottom of each color square and all ΔE values would be zero. However, in practice system A and system B do show differences in performance, as indicated by the large color differences and large ΔE values for the twenty-four color squares in the left half of FIG. 3. But the color differences and ΔE values are smaller for the corresponding twenty-four color squares at the right side of FIG. 3, showing that the conversion of colors from system A values to system B values according to the inventive technique substantially compensates for the difference between systems A and B.

Figure 4:
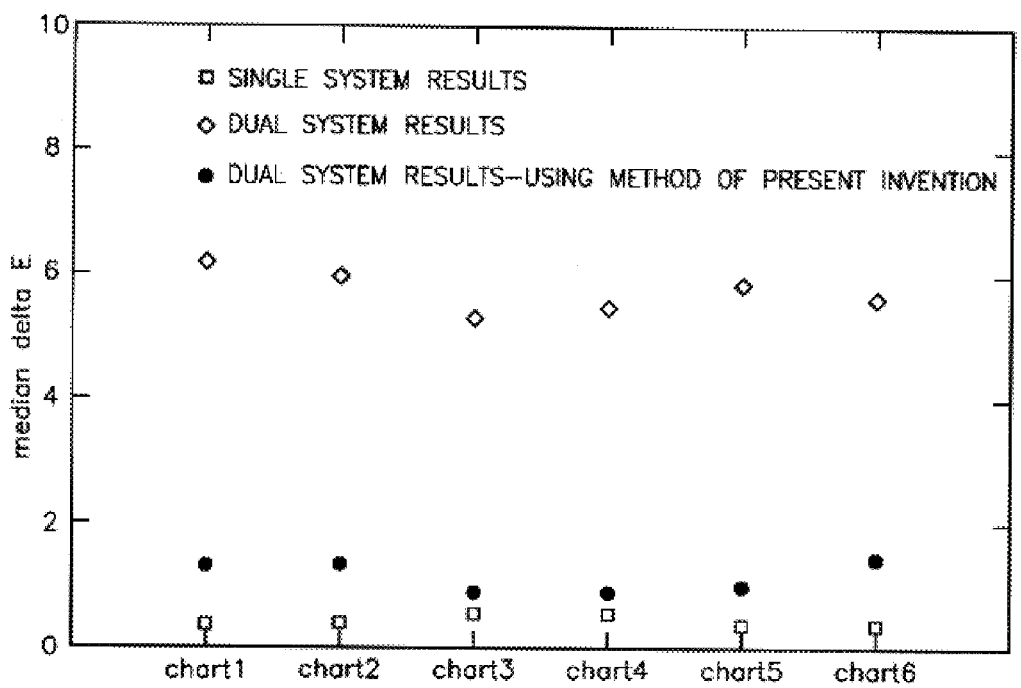
FIG. 4 shows a graphical representation of the median $\Delta E$ for a number of different color patches on six different color charts for a single machine vision system, two different machine vision systems, and two different machine vision systems that were corrected using the method of the present invention.
Figure 5:
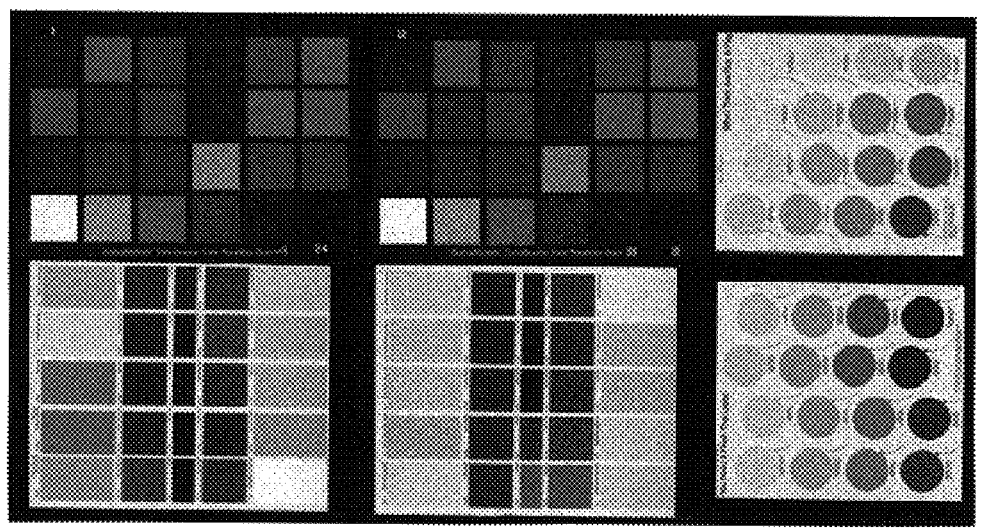
FIG. 5 shows the color charts used in the comparison of FIG. 4.

Referring now to FIG. 4, a graphical representation of the median ΔE for a number of different color patches on six different color charts (see FIG. 5) is shown. The single system results represent the performance obtained on a single machine vision system, where the first and second measurements are done on the same system. Even in this best case scenario, the ΔE values are not zero, but they are less than unity. The dual system results represent the performance obtained from using two different machine vision systems without using a digital reference set correction. The dual system results provided ΔE values around 6. The third set of results represent the performance obtained from using two different machine vision systems that were corrected using the digital reference data set. The dual system performance—using a digital reference set correction, showed much better performance than without correction, but still not quite as good as for a single system.

In another embodiment of the present invention, a digital reference set can be utilized in multispectral applications. Multispectral imaging is a generalization of the concept of color imaging using N different color channels. If N=3 and the channels correspond to RGB, then one obtains traditional color imaging. If N=1 and the channel corresponds to image brightness, then one obtains traditional monochrome imaging (the "green" or "luminance" channel Y function can be used as the system-independent measure of brightness for N=1). Other possibilities include, for example, N=4, with 3 channels corresponding to RGB and the 4th channel corresponding to infrared. Although no CIE tristimulus and ΔE concepts are available for multispectral work, it is still possible to define analogs of these concepts and use them to normalize images. The calibration mathematics readily generalizes to a simple linear transform:

$$V_n = V_{0n} + \sum_{m=1}^{N} M_{nm} C_m,$$

where Vn represents the nth "tristimulus" value (n=1, 2, ..., N), Cm is the mth measured "color" value, and $V_{0m}$ and $M_{nm}$ are constants derived via calibration. A corresponding inverse transform can also be calculated in terms of the inverse of matrix M. As with the previous embodiment, other more elaborate transforms may also be used and are contemplated herein.

Although the present invention has been described above in detail, the same is by way of illustration and example only and is not to be taken as a limitation on the present invention.

What is claimed is:

1. A video inspection method comprising the steps of:
determining a color response function for a first machine vision system,
determining a color response function for a second machine vision system,
acquiring a first video image of a reference object on the first machine vision system,
combining the first video image with the color response function for the first machine vision system to obtain a colorimetric image,
transporting the colorimetric image to the second machine vision system,
calculating a second video image using the colorimetric image and the color response function for the second machine vision system, wherein the second video image simulates the video image of the reference object imaged on the second machine vision system, and
using the second video image as a reference for comparisons during video inspection on the second machine vision system.

2. The method of claim 1, wherein the step of determining a color response function for a first machine vision system comprises the steps of
imaging a first plurality of objects having known colorimetric color values using a first video camera to obtain a first corresponding plurality of video color values;
using a mathematical mapping function to approximate the best fit between the video and colorimetric color values.

3. The method of claim 2, wherein the step of using a mathematical mapping function comprises the step of using linear regression to develop a linear transform forming a linear regression between the video and calorimetric color spaces.

4. The method of claim 2, wherein the step of using a mathematical mapping function comprises the step of using linear regression to develop a linear transform utilizing a 3×3 matrix and an offset vector.

5. The method of claim 1, wherein the step of calculating a second video image using the calorimetric image and the color response function for the second machine vision system comprises the steps of:
calculating each pixel of second video image from each pixel of the colorimetric image,
combining the calculated pixels to form the second video image.

6. The method of claim 1, wherein the step of transporting the colorimetric image to the second machine vision system is done electronically.

7. A video inspection method comprising the steps of:
providing first color data;
obtaining second color data from the first color data, representing output of a first machine vision system;
mapping the second color data to the first color data to obtain a transformation function for the first machine vision system;
providing third color data;
obtaining fourth color data from the third color data, representing output of a second machine vision system;
mapping the fourth color data to the third color data to obtain a transformation function for the second machine vision system;
providing a reference object;
obtaining fifth color data from the reference object, representing output of the first machine vision system;
combining the fifth color data with the transformation function for the first machine vision system to obtain a sixth color data;
transporting the sixth color data from the first machine vision system to the second machine vision system,
calculating a seventh color data on the second machine vision system using the sixth color data and the transformation function for the second machine vision system, wherein the seventh color data corresponds to a simulated output of the second machine vision system in response to the reference object, and
using the seventh color data as a reference for comparisons during video inspection on the second machine vision system.

8. A video inspection method comprising the steps of:
imaging a first plurality of objects having known colorimetric values using a first video camera of a first machine vision system to obtain a first corresponding plurality of video color values;
developing a calibration function of the first video camera;
imaging a reference object with the first video camera to obtain a first reference image,
combining the first reference image and the calibration function of the first video camera to form a device-independent reference image;
imaging a second plurality of objects having known calorimetric color values using a second video camera of a second machine vision system to obtain a corresponding second plurality of video color values;
developing a calibration function of the second video camera;
transporting the device-independent digital reference image to the second machine vision system;
calculating a second reference image using the calibration function of the second video camera and the device independent reference image, wherein the second reference image approximates a reference image of the reference object using the second video camera; and
using the second video image as a reference for comparisons during video inspection on the second machine vision system.

9. The video inspection method of claim 8, wherein the step of developing a calibration function of the first video camera comprises the step of:

mathematically mapping the first video color values to their corresponding first colorimetric color values.

10. The video inspection method of claim 9, wherein the step of mathematically mapping the first video color values to their corresponding first colorimetric color values is accomplished by using linear regression to develop a linear transform.

11. The video inspection method of claim 9, wherein the step of mathematically mapping the first video color values to their corresponding first calorimetric color values is accomplished by using linear regression to develop a linear transform utilizing a 3×3 matrix and an offset vector.

12. The video inspection method of claim 8, wherein the step of developing a calibration function of the second video camera comprises the step of:

mathematically mapping the second video color values to their corresponding second calorimetric color values.

13. The video inspection method of claim 12, wherein the step of mathematically mapping the second video color values to their corresponding second colorimetric color values is accomplished by using linear regression to develop a linear transform.

14. A video inspection method for machine vision systems having a color video camera, the method comprising the steps of:

performing a calibration of a first machine vision system resulting in a first mathematical mapping function between video and calorimetric color spaces;

performing a calibration of a second machine vision system resulting in a second mathematical mapping function between video and colorimetric color spaces;

acquiring a first digital video image on the first machine vision system;

using the first mathematical mapping function to convert the first digital video image into a digital calorimetric image;

transferring the digital colorimetric image to the second machine vision system;

using the second mathematical mapping function to convert the digital colorimetric image into a second digital video image on the second machine vision system;

using the second digital video image as a reference for comparisons during video inspection on the second machine vision system.

15. The method of claim 14, wherein the step of using the first mathematical mapping function to convert the first digital video image into a digital calorimetric image comprises the steps of:

calculating each pixel of the digital calorimetric image from each pixel of the first digital video image, combining the calculated pixels to form the digital calorimetric image.

16. The method of claim 14, wherein the step of transferring the digital colorimetric image to the second machine vision system is accomplished by sending the digital image electronically.

17. The method of claim 14, wherein the first and second mathematical mapping functions utilize linear regression to develop a linear transform utilizing a 3×3 matrix and an offset vector.

18. The method of claim 14, wherein the step of using the second mathematical mapping function to convert the digital calorimetric image into a second digital video image on the second machine vision system comprises the steps of:

calculating each pixel of the second digital video image from each pixel of the digital calorimetric image, combining the calculated pixels to form the second digital video image.

* * * * *